3,291,779
CUPROUS p-HALOTHIOPHENOXIDE
Carl E. Handlovits, Midland, and James B. Louch, Coleman, Mich., assignors to The Dow Chemical Company, Midland, Mich., a corporation of Delaware
No Drawing. Filed Mar. 27, 1963, Ser. No. 268,470
12 Claims. (Cl. 260—79)

The present invention relates to a method for preparing a monomer in good purity so that a high molecular weight polymer will result. More particularly, the present invention concerns a method for preparing a copper salt of a halothiophenoxide in a purity which will permit the ultimate production of a high molecular weight linear polyphenylene sulfide.

Linear polyphenylene sulfides have been prepared by Macallum, U.S. Patents Nos. 2,513,188 and 2,538,941. However, because of side reactions which occur when employing the starting materials of Macallum the molecular weight of the polymers is relatively low, difficult to reproduce and substantially commercially uneconomical. Therefore, the preparation of a monomer which produces a high molecular weight linear polymer i.e. near theoretical molecular weight for a given set of conditions, and is reproducible on a commercial scale would be advantageous. The linear polyphenylene sulfides are useful as adhesives and to form fibers.

It has now been found that the cuprous halothiophenoxides are desirable starting monomers for preparing linear polyphenylene sulfides. The technique for preparing the linear polymers is clearly set forth in copending application Serial No. 85,209, filed January 23, 1961, now abandoned, for "Method for Preparing Linear Polyarylene Sulfide." The method here taught for preparing the monomer comprises: reacting for from about 4 hours to about 9 days at from about 80° C. to the reflux temperature (about 180° C.) up to 1 mole of copper metal (in the form of dust or powder) with 1 mole of a bis(p-haloaryl)disulfide. It is not advisable to employ excess copper which is insoluble as is the product, since it requires a separation step. The reaction proceeds smoothly in the presence of a solvent for the reactant halothiophenoxide and preferably is a lower alkanol such as ethanol, propanol, isopropanol, n-butanol, sec. butanol, and the like. The preferred temperature range is the reflux temperature obtainable when using the lower alkanol solvents. The process also proceeds more rapidly when a catalyst having an amino nitrogen is employed when a solvent is used. Catalysts such as pyridine, quinoline, lutidine and the like when used with the solvent are particularly advantageous.

The bis(haloarylene) disulfides which can be employed are those having the generic formula:

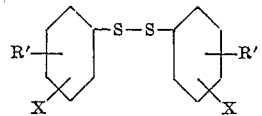

wherein $R_1$ represents hydrogen, a lower aliphatic radical having from 1 to 4 carbon atoms, or

and has no groups reactive with copper or halogen under the conditions of reaction, and is preferably, methyl, ethyl, propyl, isopropyl, butyl, sec. butyl and tert. butyl, and their chlorinated or brominated analogs and $R_2$ is hydrogen or a lower aliphatic radical, however, those having longer aliphatic chains and those having olefinic unsaturation are not inoperative, the symbol X represents a halogen having an atomic number from 17 to 35, viz., bromine or chlorine.

The following examples illustrate the present invention but are not to be construed as limiting.

*Example 1*

A mixture of 1.5 grams (0.0236 moles) of copper metal (in form of dust), 4.5 grams (0.0118 mole) of bis(p-bromophenyl) disulfide, 25 ml. of pyridine and 200 ml. of n-butanol was stirred and heated at reflux for 40 hours. The light yellow cuprous p-bromothiophenoxide was collected by filtration, washed with acetone and dried at 70° C. to a pressure of 0.01 micron mercury. 4.6 grams (78% yield) of cuprous p-bromothiophenoxide was isolated.

*Analysis.*—Calculated for $C_6H_4BrSCu$: C, 28.52; S, 12.69; Br, 31.62; Cu, 25.14, H, 2.01. Found: C, 28.78; S, 12.64; Br, 30.30; Cu, 26.60.

*Example 2*

A mixture of 58.5 grams (0.31 equivalent) of bis(parabromophenyl) disulfide and 400 ml. of n-butyl alcohol were placed in a reaction flask and flushed with an argon atmosphere. 13.3 grams (0.208 mole) of fresh copper (prepared by the method of Vogel) was added to the reaction vessel. The mixture was heated to reflux (119° C.) with stirring under an argon atmosphere for 9½ days. The color had changed from a reddish brown at the start of the reaction to a bright yellow color at the completion of the reaction. The hot mixture was filtered, washed with 3 liters of acetone and vacuum dried at 75° C. for 20 hours. 52 grams (100% yield) of the copper salt of parabromothiophenol was isolated.

Found: C, 29.72; H, 2.08; S, 13.16; Cu, 23.96; Br, 31.24.

Percent inorganic copper—none
Percent inorganic bromine—none
Melting point—277–278° C.

In like manner employing bis(p-chlorophenyl) disulfide in place of bis(p-bromophenyl) disulfide there was obtained cuprous p-chlorothiophenoxide.

*Example 3*

The same amount of reactants which were used in Example 2 were used in this example. Also, 1.6 g. (0.02 mole) of pyridine (1 mole pyridine/10 moles of copper) was added. Carrying out the reaction under the same reaction conditions as shown in Example 2, the reaction was completed in 4 days. The yield was 51.2 g. (98%).

*Analysis.*—Calculated for $C_6H_4CuSBr$, found: C, 30.12; H, 2.53; S, 13.24; Cu, 23.93; Br, 31.50.

Percent inorganic copper—none.
Percent inorganic bromine—none
Melting point—277–278° C.

*Example 4*

234 grams (1.24 equivalent of bis(parabromophenyl) disulfide, 53 grams (0.83 mole) of freshly prepared copper metal were placed in 1580 ml. of normal butyl alcohol, to which was added 98 grams (1.24 moles) pyridine (1.5 moles pyridine/mole of copper). The reaction was carried out under an inert atmosphere of argon and completed in a period of 2 days. The yield was 207 grams (99%) of the copper salt of parabromothiophenol.

*Analysis.*—Calculated for $C_6H_4CuSBr$, found: C, 28.68; H, 2.30; S, 12.90; Cu, 24.72; Br, 30.30.

Percent inorganic copper—none
Percent inorganic bromine—none

Example 5

Preparation of

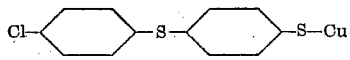

18.9 grams 0.075 equivalent (0.038 mole) of

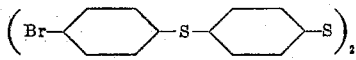

3.18 grams (0.05 mole) of freshly prepared copper metal and 5.93 grams (0.075 mole) of pyridine were reacted in 125 ml. of normal butyl alcohol at 119° C. for 24 hours. 14.6 grams (98.7%) of the copper salt was isolated having a melting point of 244.5–245° C.

In like manner employing

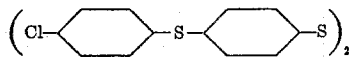

in place of

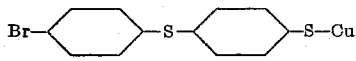

there is obtained

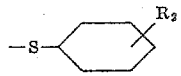

The linear polymers prepared from the cuprous salts of this invention are suitable for drawing or extruding into fibers. Such fibers have properties similar to the linear resin, that is, thermal stability to about 250° to 350° C. in air without materially degrading, are adhesive in nature at about their fusion point and are chemically stable at temperatures to about 200° C. The fibers can be prepared in the conventional manner such as drawing a strand from a fused mass or extruding a fiber from a spinnerette or die.

We claim:
1. A method which comprises reacting a mole of bis (haloaryl) disulfide having the generic formula

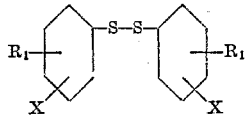

wherein $R_1$ represents a member selected from the group consisting of hydrogen, a lower aliphatic radical having from 1 to 4 carbon atoms and $$-S-\underset{R_2}{\bigcirc}$$

wherein $R_2$ is a member selected from the group consisting of hydrogen and lower aliphatic radicals, and X represents a halogen having an atomic number from 17 to 35, with up to 1.0 mole of copper at from about 80° to about 180° C. for from about 4 hours to about 9 days under an atmosphere inert under the reaction conditions, to prepare the corresponding cuprous p-halothiophenoxide.

2. A method which comprises reacting a mole of bis (p-bromophenyl) disulfide with up to 1 mole of copper at from about 80° to about 180° C. for from about 4 hours to about 9 days under an atmosphere inert under the reaction conditions, to prepare the corresponding cuprous p-halothiophenoxide.

3. The method of claim 2 wherein the reaction is carried out in the presence of a lower alkanol.

4. The method of claim 3 wherein an organic amino nitrogenous base is employed as a catalyst in an amount of from about 0.1 to 1 parts per part of copper.

5. A method which comprises reacting a mole of

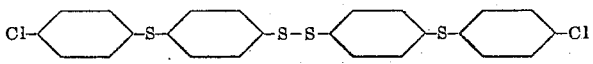

with up to 1 mole of copper at from about 80° to about 180° C. for from about 4 hours to about 9 days under an atmosphere inert under the reaction conditions, to prepare the corresponding cuprous p-halothiophenoxide.

6. A method which comprises reacting a mole of

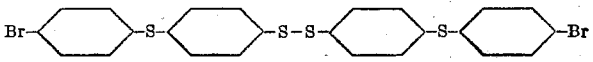

with up to 1 mole of copper at from about 80° to about 180° C. for from about 4 hours to about 9 days under an atmosphere inert under the reaction conditions, to prepare the corresponding cuprous p-halothiophenoxide.

7. A method which comprises reacting a mole of bis (chlorophenyl) disulfide with up to 1 mole of copper at from about 80° to about 180° C. for from about 4 hours to about 9 days under an atmosphere inert under the reaction conditions, to prepare the corresponding cuprous p-halothiophenoxide.

8. Cuprous p-bromothiophenoxide.
9. Cuprous p-chlorothiophenoxide.
10.
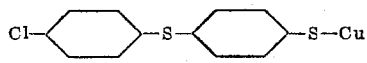
11.
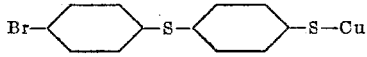

12. A fiber comprising a filament drawn from a fused composition consisting of a linear polyphenylene sulfide having a molecular weight above about 2000, prepared by homopolymerizing cuprous p-bromothiophenoxide prepared in accordance with the procedure of claim 1.

References Cited by the Examiner
UNITED STATES PATENTS

| | | | |
|---|---|---|---|
| 2,538,941 | 1/1951 | Macallum | 260—79 |
| 2,790,833 | 4/1957 | Liao | 260—608 |

JOSEPH L. SCHOFER, *Primary Examiner.*

J. F. McNALLY, D. K. DENENBERG,
*Assistant Examiners.*